UNITED STATES PATENT OFFICE 2,367,181

METHOD OF MAKING GASKET MATERIAL

Wilburn F. Bernstein, Brookfield, Thomas F. Mika and Stephen M. Lillis, Chicago, and Otha L. Colwell, Cicero, Ill., assignors to Victor Manufacturing & Gasket Company, Chicago, Ill., a corporation of Illinois No Drawing. Original application January 16, 1940, Serial No. 314,134. Divided and this application May 19, 1942, Serial No. 443,628

3 Claims. (Cl. 92—21)

The present invention relates to gaskets and more particularly to a novel method of manufacture of the asbestos base or board suitable for use as a gasket, either with or without reinforcing core or metal backing, of the type especially adapted for use in cylinder head, manifold and other gaskets for internal combustion engines, or wherever relatively high pressures, temperatures and severe working conditions are encountered.

In the present novel method of fabricating a gasket, the asbestos base board is made upon a paper making machine in which the fiber and binder are uniformly distributed throughout the entire sheet, resulting in a continuously uniform product.

The invention further relates to the novel steps of manufacture which result in a considerable saving in production operations required in fabricating the completed gasket as well as a considerable saving in labor, materials and cost of manufacture. The present application is a division of our co-pending application, Serial No. 314,134, filed January 16, 1940, now U. S. Patent 2,319,033.

In the manufacture of the gasket material, the asbestos base board is first produced and may be later combined with a reinforcing core or backing which may be of perforated or expanded metal, wire screen or other reinforcement. Excellent results have been secured in the preparation of the base board by adding approximately 200 pounds of asbestos fibers consisting in approximately 150 pounds of asbestos virgin fiber and 50 pounds of asbestos scrap fiber containing set cement, to water in a beater of the conventional paper making type. This proportion of virgin and scrap fiber may be varied and good results have been secured by varying the proportions anywhere between the limits of all virgin to all scrap.

To the asbestos fiber and water is added a black dye solution in a quantity sufficient to uniformly stain the fiber surfaces when thoroughly mixed. Black water-soluble dye of the amine type has given us excellent results when mixed with substantially 200 pounds of fiber in approximately the following proportions:

| | |
|---|---|
| Black dye | lbs__ 3 |
| Water | qts__ 2 |

The dye and water are thoroughly dissolved before it is added.

A fatty acids emulsion is then prepared. One example of such an emulsion with which we have secured good results consists in the following ingredients in approximately the following proportions:

| | Pounds |
|---|---|
| Water | 305 |
| Fatty acids | 43 |
| Crude scale wax | 19 |
| Bentonite | 6 |
| Long chain alcohol sulfates | 2/3 |

In the preparation of this emulsion, the water is heated to approximately 150° F. and the long chain alcohol sulfates and bentonite are then added and thoroughly dissolved and dispersed throughout the water. The fatty acids and wax, which have previously been melted together and while in this state, are then emulsified in the mixture of water, bentonite and alcohol sulfates previously prepared in a conventional type colloid mill. The combination of wax, bentonite and alcohol sulfates in approximately the above proportions may be varied through a suitable range from approximately 10% to 40% of the resultant emulsion. This emulsion is then slowly added to the asbestos, water and dye in the beater. The term fatty acids refers to those present in fats and glyceride type of oils.

Good results have been had in substituting for the fatty acids in the above formula, a blend of cooked linseed oil and raw soy bean oil which may vary between 25% to 75% of the linseed oil to 75% to 25% of the soy bean oil, in substantially the same amount as that given for the fatty acids. Another substitute which has given us good results is any blend of drying and nondrying oils which may be substituted in like amount for that of the fatty acids. Also, pitches of fatty materials, tars, waxes or triglyceride esters of fatty acids may be employed.

Following the addition of the fatty acids emulsion, the invention comprehends adding a carbon black or pigment dispersion. One example of such a dispersion may consist in the following ingredients in approximately the following proportions:

| | |
|---|---|
| Carbon black (gas origin) | pounds__ 16 |
| Graphite (325 mesh) | 4 |
| Bentonite | do____ .4 |
| Polymerized salts of sulphonic acids of the alkyl aryl type | do____ .2 |
| Water | gallons__ 5 |

In the pigment dispersions, barytes, metallic oxides, asbestine, etc. may be substituted for and in substantially the same proportion as the carbon black. The water is heated to approximately 150° F., after which the bentonite and the polymerized salts of sulphonic acids of the alkyl aryl type are dispersed and dissolved therein. Then the carbon black or pigment and graphite are added and the entire mix is dispersed in a colloid mill.

Upon the addition of the carbon black or pigment dispersion, the resulting aggregate is thoroughly mixed until all materials are precipitated on the fiber, after which the beater batch thus made is dropped into the paper machine and sheeted into boards.

The thorough mixing with and complete precipitation of the binder upon the fiber is probably due to an electrical charge possessed by these substances. In other words, the asbestos fiber has a distinct electrical charge and the emulsion particles contain a charge opposed to or unlike that of the fiber. When these fiber and emulsion particles are placed in intimate contact in water containing mineral matter, the oppositely charged particles of the emulsion are drawn out of suspension and precipitated upon the fiber. Although there are numerous theories concerning the breaking of emulsions, this electrical theory appears to be the most plausible and easily explainable in the present situation.

The active binding ingredients are the fatty acids or the oils, as the case may be, and may be used in varying proportions in relation to the asbestos fiber, varying from 10% to 25%. The more binder used, the more flowable is the resultant sheet.

Furthermore, certain definite chemical changes take place after the emulsions are precipitated upon the fiber. These may be summarized as follows:

(1) The fatty acids partially react with the magnesium, as well as with any calcium, aluminum, iron or other salts that may be present in the asbestos, to form a corresponding soap of an insoluble nature. Later, after the water has been removed by drying and the board is baked, further reaction takes place with the remaining fatty acids forming a resinous or resin-like substance. In case the oils are substituted for the fatty acids, they are oxidized to thereby increase their toughness and heat stability. If it is desired to accelerate the oxidation, this may be accomplished by adding a drier such as magnesium lead resinate to the oil emulsion.

(2) The wax addition acts as a plasticizer, although no such plasticizer is required in case the oils are used for the fatty acids. The semi-drying or non-drying oil, whichever is used, then acts as a plasticizer in these blends.

(3) The bentonite is a supporting colloid.

(4) The long chain alcohol sulfates provide a dispersing and wetting agent.

(5) The function of the black dye is to stain the fiber.

(6) The carbon black or pigments and graphite which are precipitated out on the fiber act to fill the interstices between the fiber, render the sheet more flexible and additionally pigment the sheet.

(7) The other materials in the carbon black or pigment dispersions are merely there for the purpose of wetting the carbon black or pigment and to act as supporting colloids.

Other wetting agents and supporting colloids may be used with success. Among these wetting agents are alkyl aryl sulfates, sulfonated esters of dicarboxylic acid, monobutyl phenyl phenol, sodium monosulfonite, sodium salts of sulfonated lauryl and myristyl colamide. Among the supporting colloids are methyl cellulose, gum algae and others suitable for the purpose.

Although gaskets constructed of one or more sheets of asbestos board with an interposed reinforcement or backing of metal are now upon the market, difficulty has been had both in their manufacture and use in that they lack uniformity due to the fact that the asbestos board was first made, dried and then combined with the core or backing and the gasket so formed was then treated with the desired saturating solution and coating. In such structures, the base board does not firmly anchor to the metal and does not flow into and completely fill all openings or interstices in the core or backing. Furthermore, it has different adsorptive characteristics throughout its extent and selective filtration has a tendency to leave the solids in the saturating solution used upon the surface of the asbestos board instead of having it distributed uniformly throughout the fibrous structure of the board. Difficulty was also experienced in controlling the thickness and dimensions of the gasket. In an endeavor to maintain such dimensions, it was essential that the percentage of saturation be accurately controlled and the gasket re-rolled to the desired thickness. Frequently considerable quantities of material were scrapped due to the fact that in an endeavor to maintain thickness control, the compressibility of the finished gasket could not be made uniform or standardized. Thus this prior construction and method frequently proved expensive and resulted in a large percentage of scrap.

In addition, the treatment of the gaskets so produced required a large number of production operations which are materially reduced by the present invention, thereby effecting a considerable saving in the cost of production, as well as in the number and quantities of materials used in the manufacture of such prior gaskets.

The asbestos board or sheet, before it is baked and converted by heat reaction, is sufficiently plastic as to flow under pressure and may be combined with and rigidly anchored to any suitable reinforcing core or backing in such a way as to flow into all of the interstices, prongs or other anchoring means in the core or backing, as well as to completely fill all available spaces within all grommets or flanges with which such gaskets are supplied. The novel form of binder employed gives the asbestos sheet or board these flow characteristics which are materially reduced after baking, so that this sheet becomes a stable board, self-supporting and with sufficient inherent strength that it may be used as a gasket without any reinforcing core or backing, although maintaining its compressible or resilient characteristics so essential in an efficient gasket. These latter characteristics, as well as the flowability of the asbestos sheet, may be controlled within definite limits by the bake.

Before the gasket material or asbestos board has been baked and before it is applied to a motor or other part, it is dipped or coated with an antistick to prevent its sticking to the parts to which it is applied. An example of a coating which renders it non-sticky in use and with which we have secured excellent results consists in the following in approximately the given proportions:

*Mix No. 1*

| | | |
|---|---|---|
| Water at 150° F | cc | 4000 |
| Bentonite | grams | 100 |
| Graphite of 325 mesh | do | 750 |

*Mix No. 2*

| | | |
|---|---|---|
| Water at 150° F | cc | 7000 |
| Sodium meta silicate | grams | 1500 |
| Black dye—amine type | do | 80 |

*Mix No. 3*

| | | |
|---|---|---|
| Neutral sodium silicate | cc | 3500 |

Each mix is thoroughly combined as by dispersion or solution, after which mix No. 1 is dispersed in mix No. 2 preferably by relatively high speed agitation. The resultant mix is then added to mix No. 3 and dispersed therein. As in the previous dispersion, this is preferably accomplished by relatively high speed agitation. The final resultant mix provides an excellent coating or dip which, when applied to the faces of the gasket material, prevents sticking to the parts to which the gasket is applied. Although we have set forth in detail the preferred quantities in the above formulae, it is to be understood that these may be varied through a reasonable range to give the desired results. Furthermore, the invention contemplates other coating materials which would render the gasket non-sticky in use.

From the above disclosure, it will be apparent that our invention comprehends a novel method of forming a gasket material, whether in sheet form or in the form of blanked sheets adaptable for gasket use, either with or without a reinforcing core or backing. The asbestos fiber and binder are combined in the beater and the resulting material so produced is sheeted upon a paper making machine forming an asbestos base or board rendered plastic and homogeneous throughout by the disclosed binder. The flow characteristics of this sheet before the binder is heat converted makes for a material that is admirably adapted for gasket use. Furthermore, sufficient flowability in the finished sheet is desired to adjust itself to the contour of the surfaces to which it is applied, although not sufficient to cause extrusion.

Having thus disclosed the invention, we claim:

1. The method of producing a sheet of compressible gasket material, comprising the steps of adding asbestos fiber suitable for gasket manufacture to water in a beater, adding a black dye solution to the fiber and water in the beater in an amount sufficient to uniformly stain the fiber when thoroughly mixed, preparing a fatty acids emulsion from long chain alcohol sulfates and bentonite dissolved in water heated to a temperature of approximately 150° F. to which is then added fatty acids present in fats and glyceride type of oils and wax melted together and emulsified in the mixture of water, bentonite and alcohol sulfates to form an emulsified binder, slowly adding the emulsified binder to the beater, adding a pigment dispersion to the aggregate in the beater and thoroughly mixing the resulting aggregate until the ingredients are precipitated on the fiber, sheeting the beater batch to produce a homogeneous sheet having flow characteristics to facilitate combining the sheet with a core or backing and integrally connecting the sheet therewith, and thereafter subjecting the sheet to a bake for heat converting the binder to materially reduce its flow characteristics.

2. The method of making a compressible gasket material of asbestos suitable for gasket manufacture and a binder, comprising the steps of preparing a fatty acids emulsion by mixing a solution of long chain alcohol sulfates and bentonite with fatty acids present in fats and glyceride types of oils and wax, adding the emulsion so produced to a beater containing the asbestos fiber and water, breaking the emulsion on the fiber, adding a pigment dispersion to the aggregate in the beater, thoroughly mixing the aggregate until the ingredients are precipitated on the fiber, sheeting the resultant mix on a paper machine, removing the water by drying and then subjecting the dried sheet to a bake for reacting the fatty acids with the asbestos to thereby form a reaction product bonding the asbestos fiber and imparting flow characteristics to the finished sheet but preventing its extrusion under the pressure and temperatures encountered in use.

3. The method of making a compressible gasket material of asbestos suitable for gasket manufacture and a binder with the active binding ingredients being in the proportion of approximately 10% to 25% of the fiber employed, comprising the steps of adding asbestos fiber to water in a beater, preparing a fatty acids asbestos reaction product by emulsifying fatty acids present in fats and glyceride type of oils and wax with a solution of long chain alcohol sulfates and bentonite, adding the emulsion to the fiber and water in the beater, breaking the emulsion on the fiber, sheeting the resultant mix on a paper machine to form a sheet in which the binder is uniformly distributed throughout the sheet and gives to the sheet plasticity and flow characteristics, and then subjecting the sheet to a bake to react the fatty acids with the asbestos fiber and convert the binder by reaction with the asbestos to produce a stable asbestos sheet and materially reduce its flow characteristics.

WILBURN F. BERNSTEIN.
THOMAS F. MIKA.
STEPHEN M. LILLIS.
OTHA L. COLWELL.